(12) United States Patent
Kaleta et al.

(10) Patent No.: US 10,330,333 B2
(45) Date of Patent: Jun. 25, 2019

(54) PORTABLE MISTING FAN WITH PIVOTING HEAD

(71) Applicants: Bryan Kaleta, Darien, IL (US); Mark Kaleta, Darien, IL (US)

(72) Inventors: Bryan Kaleta, Darien, IL (US); Mark Kaleta, Darien, IL (US)

(*) Notice: Subject to any disclaimer, the term of this patent is extended or adjusted under 35 U.S.C. 154(b) by 138 days.

(21) Appl. No.: 15/306,827

(22) PCT Filed: Apr. 17, 2015

(86) PCT No.: PCT/US2015/026316
§ 371 (c)(1),
(2) Date: Oct. 26, 2016

(87) PCT Pub. No.: WO2015/167821
PCT Pub. Date: Nov. 5, 2015

(65) Prior Publication Data
US 2017/0045246 A1    Feb. 16, 2017

Related U.S. Application Data

(60) Provisional application No. 61/985,734, filed on Apr. 29, 2014.

(51) Int. Cl.
*F24F 6/14*    (2006.01)
*F24F 7/007*    (2006.01)
(Continued)

(52) U.S. Cl.
CPC ............... *F24F 6/14* (2013.01); *F24F 7/007* (2013.01); *F24F 13/20* (2013.01); *F04D 25/105* (2013.01);
(Continued)

(58) Field of Classification Search
CPC .......... F04D 25/105; F04D 25/10; F24F 6/14; F24F 13/20; F24F 7/007; F24F 6/00; Y02B 30/545
See application file for complete search history.

(56) References Cited

U.S. PATENT DOCUMENTS 2,650,019 A * 8/1953 Lautner et al. ....... F04D 29/646
417/359
2,768,782 A * 10/1956 Tateishi .................. F04D 25/10
417/361
(Continued)

FOREIGN PATENT DOCUMENTS

FR    1148073    * 12/1957

OTHER PUBLICATIONS

EPO translation of Oba FR 1,148,073 published Dec. 3, 1957 (Year: 1957).*
"Screw thread" Wikipedia published Feb. 13, 2012 (Year: 2012).*

*Primary Examiner* — Stephen Hobson

(57) ABSTRACT

A portable misting fan in which the user controls the spray mist and the fan operation separately. A lower compartment stores a fluid and a pump provides the pressure to propel the fluid through a delivery tube to a spray nozzle. The flow of fluid to the nozzle is controlled by a valve that is operated by the user pushing a button. An upper compartment houses a fan which is powered by batteries and provides an air stream that is directed to the user. The fan is mounted in a fan housing in the upper compartment that is pivotally connected to the upper housing. There axe passageways in the fan housing and pivot connection for receiving the fluid delivery tube and electrical wires so that all they are all internal to the misting fan.

9 Claims, 3 Drawing Sheets

(51) Int. Cl.
  *F24F 13/20*     (2006.01)
  *F04D 25/10*     (2006.01)
  *F24F 6/00*      (2006.01)

(52) U.S. Cl.
  CPC ... *F24F 2006/008* (2013.01); *F24F 2006/143* (2013.01); *F24F 2006/146* (2013.01); *F24F 2013/205* (2013.01); *Y02B 30/545* (2013.01)

(56) References Cited

U.S. PATENT DOCUMENTS

| | | | | |
|---|---|---|---|---|
| 4,512,501 A * | 4/1985 | Foster | ............... | B05B 11/3001 |
| | | | | 222/153.13 |
| 4,839,106 A | 6/1989 | Steiner | | |
| 4,976,319 A * | 12/1990 | Eberhardt | ............... | A62C 3/00 |
| | | | | 169/15 |
| 5,480,282 A | 1/1996 | Matson | | |
| 5,620,633 A * | 4/1997 | Junkel | ............... | B01F 3/04007 |
| | | | | 239/289 |
| 5,775,590 A * | 7/1998 | Utter | ............... | B05B 15/62 |
| | | | | 239/152 |
| 5,837,167 A | 11/1998 | Lederer | | |
| 5,934,349 A * | 8/1999 | Faller | ............... | E04F 10/0666 |
| | | | | 160/127 |
| 6,086,053 A * | 7/2000 | Natschke | ............... | A01K 1/0082 |
| | | | | 261/30 |
| 6,109,874 A * | 8/2000 | Steiner | ............... | F04D 25/084 |
| | | | | 416/229 R |
| D434,840 S | 12/2000 | Schaefer | | |
| 6,257,501 B1 * | 7/2001 | Roach | ............... | B05B 1/207 |
| | | | | 239/214 |
| 6,378,845 B1 * | 4/2002 | Hsu | ............... | F24F 6/00 |
| | | | | 239/222.11 |
| 6,588,372 B1 * | 7/2003 | Terrell | ............... | A01K 1/0082 |
| | | | | 119/448 |
| 6,786,701 B1 * | 9/2004 | Huang | ............... | F04D 29/705 |
| | | | | 239/77 |
| 6,789,787 B2 | 9/2004 | Stutts | | |
| D512,482 S * | 12/2005 | Utter | ............... | D23/213 |
| 7,510,170 B2 * | 3/2009 | Huang | ............... | F24F 5/0035 |
| | | | | 261/118 |
| 7,547,364 B2 * | 6/2009 | Polak | ............... | A01K 1/0082 |
| | | | | 119/666 |
| 7,806,388 B2 * | 10/2010 | Junkel | ............... | F24F 5/0035 |
| | | | | 239/289 |
| 8,631,665 B1 * | 1/2014 | DeClementi | ............... | F25D 7/00 |
| | | | | 415/213.1 |
| 2008/0099934 A1 | 5/2008 | Chang | | |
| 2008/0169575 A1 * | 7/2008 | Chen | ............... | F24F 5/0035 |
| | | | | 261/28 |
| 2008/0237900 A1 | 10/2008 | Junkel et al. | | |
| 2009/0166444 A1 * | 7/2009 | Peterson | ............... | F04D 29/601 |
| | | | | 239/13 |
| 2009/0314216 A1 * | 12/2009 | Polak | ............... | A01K 1/0082 |
| | | | | 119/174 |
| 2011/0036926 A1 * | 2/2011 | Nunes | ............... | A01K 13/00 |
| | | | | 239/214 |
| 2013/0168882 A1 * | 7/2013 | Lykins | ............... | F04D 29/705 |
| | | | | 261/136 |
| 2014/0014740 A1 * | 1/2014 | Sands | ............... | B05B 3/022 |
| | | | | 239/289 |
| 2014/0360543 A1 * | 12/2014 | Steiner | ............... | A45B 3/00 |
| | | | | 135/66 |
| 2015/0247644 A1 * | 9/2015 | Stearns | ............... | F24F 6/14 |
| | | | | 261/37 |

* cited by examiner

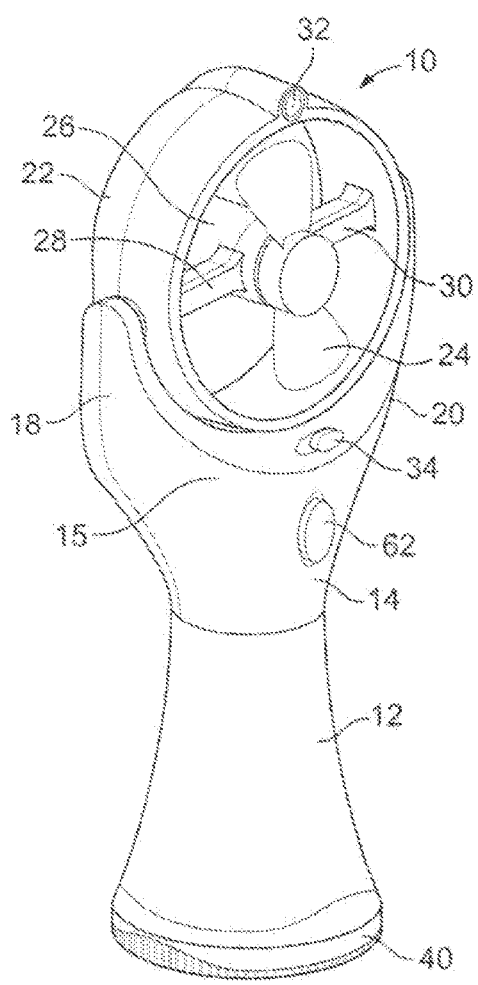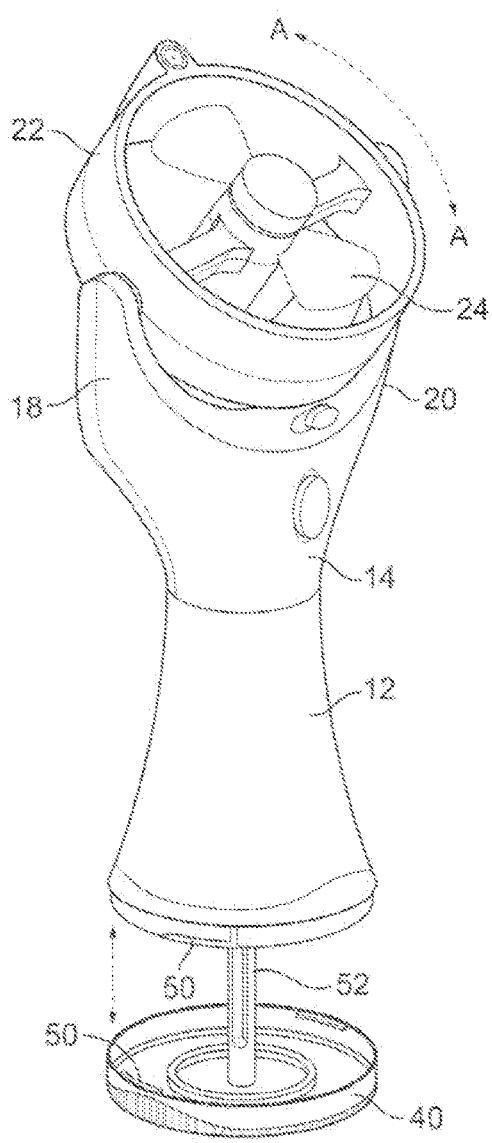
FIG. 1
FIG. 2

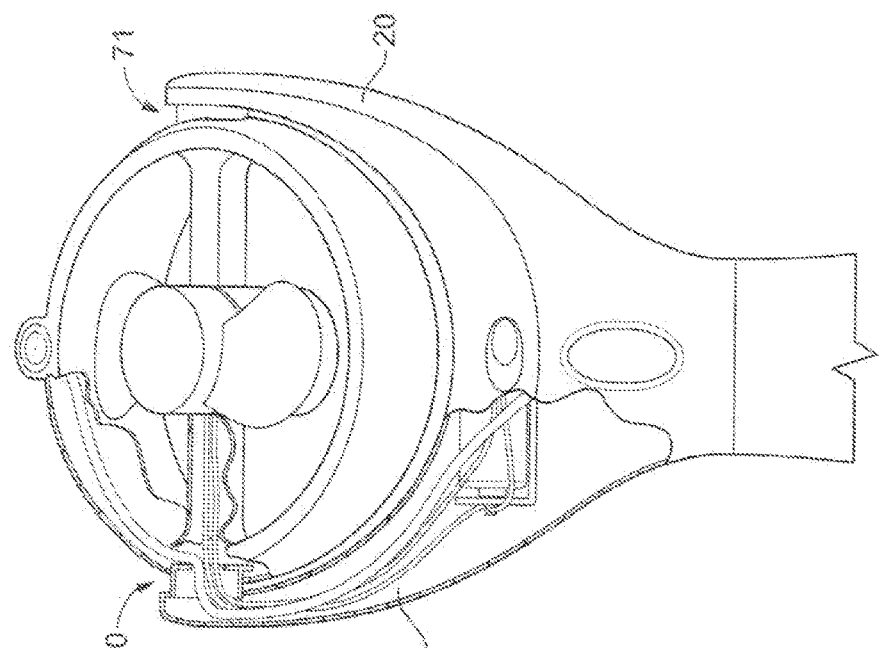
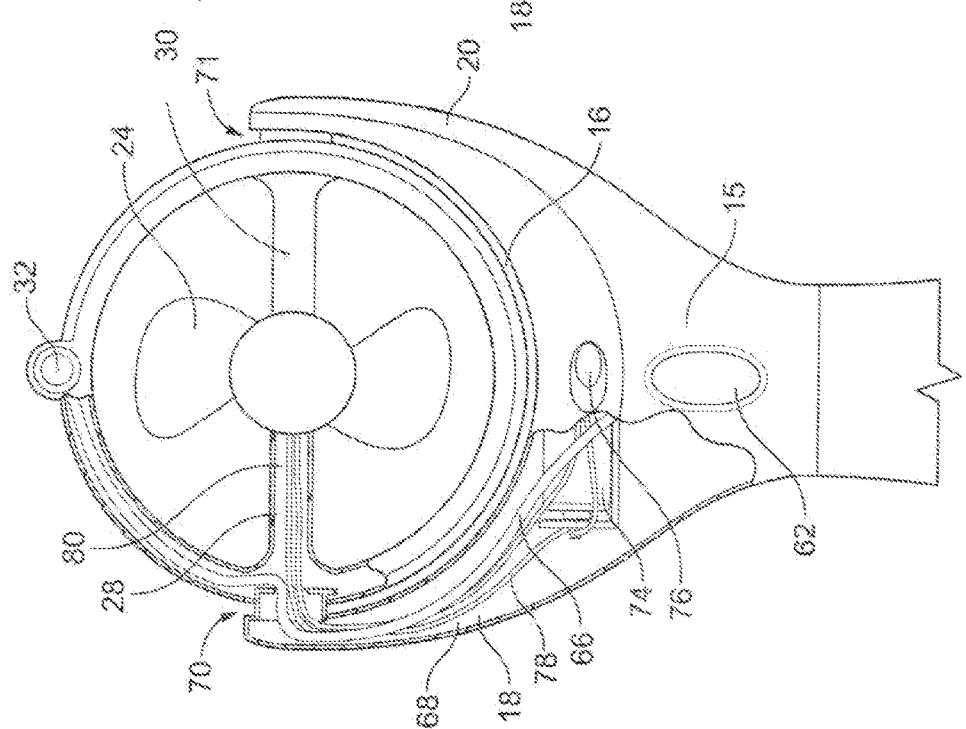

PORTABLE MISTING FAN WITH PIVOTING HEAD

CROSS REFERENCE TO RELATED APPLICATION

This application is based on and claims priority of U.S. Provisional Patent application 61/985,734 filed Apr. 29, 2014.

BACKGROUND AND SUMMARY OF THE INVENTION

This invention relates to a hand held device that is a portable misting device and a fan. The purpose of the device is to provide a spray or mist along with a cooling breeze to the user. The essence of the inventive device is to provide cooling relief to people located in a hot environment. Examples are persons at sporting events, parks, sun bathing, etc.

The inventive device has a pressurized lower compartments that functions as a reservoir for a fluid. The lower compartment is pressurized by means of a manual pump. The fluid from the pressurized compartment is forced through a delivery tube to the spray nozzle. The flow of fluid to the nozzle is controlled by a valve that is operated by the user pushing a button. There is an upper compartment that houses a fan which is powered by batteries and provides an air stream that is directed to the user. The user can control whether both the mist and fan are operated together or separately. The fan is mounted in a fan housing in the upper compartment that is pivotally connected to the upper housing. In this manner the direction of the cooling breeze and mist can be directed. The base of the device is designed so that the device can be placed on a flat surface and operated without the user having to hold it. The device can also be provided with means for attaching it to a necklace worn around the user's neck so that the device can be directed toward the user's lace without the need for holding it.

BRIEF DESCRIPTION OF THE DRAWINGS

FIG. 1 is a perspective view of the inventive misting fan.

FIG. 2 is a perspective view of the misting fan with the rotating base in the lower position for pumping air into the lower compartment, with the fan pivoted to point in an upward direction.

FIG. 4 is a front elevation view with portions removed of the misting fan showing the path of the liquid delivery tube and the electrical wines through the fan housing pivot connection.

FIG. 5 is a front elevation view with portions removed of the misting fan showing the fan housing pivoted to direct the air flow upward.

DETAILED DESCRIPTION OF THE PREFERRED EMBODIMENT

Figure 3:
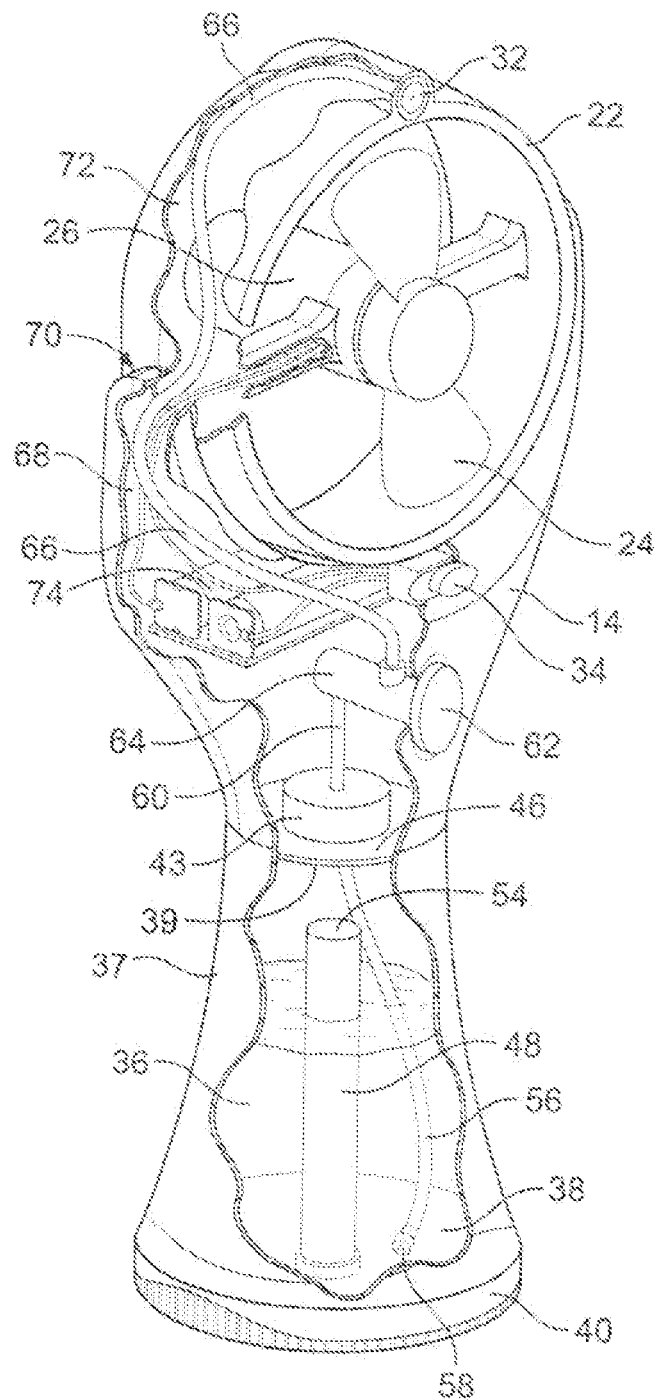
FIG. 3 is a front perspective view with portions removed to illustrate the inner components mounted the lower and upper compartments of the misting fan.

Turning first to FIG. 1 there is illustrated a misting fan 10 of the present invention. The misting fan 10 has a lower compartment 12 and an upper compartment 14. The upper compartment is shaped as a yoke 15 with a u-shaped bottom 16 and a left upstanding arm 18 and a right upstanding arm 20. A fan housing 22 is pivotably attached to the left up standing arm 18 and right upstanding arm 20 so that it can rotate as illustrated by arrow A-A in FIG. 2. A fan 24 and fan motor 26 are mounted to the fan housing 22 by means of left support beam 28 and opposite right support beam 30. At the top of the fan housing 22 an atomizer spray nozzle 32. The fan motor 26 is turned on and off by means of a fan on-off electrical switch 34.

Turning to FIG. 3, the internal components of the misting fan 10 are seen. The lower compartment 12 is a liquid reservoir that contains a liquid 36, generally water, which is to be misted when operating the misting fan 10. The lower compartment 12 has side cylindrical side walls 37, a floor 33 and a top 39. There is an opening (not illustrated) in the center of the top 39 through which the liquid 36 is poured into the lower compartment 12. The top 39 is also provided with a threaded nozzle or tube (not illustrated) that is received in a complementary threaded cap 43 in a bottom plate 46 in the upper compartment 14. In this manner the lower compartment 12 is self contained and is removably attached to the upper compartment 14. When the lower compartment 12 is attached to the upper compartment 14, the lower compartment 12 is a fluid tight container for containing the liquid.

There is an air compressor/pump 48 mounted to the floor 38 in the lower compartment 12. The purpose of the air compressor/pump 48 is to pressurize the lower compartment 12. The air compressor/pump 48 is of a standard design and will allow air to be pumped into the lower compartment 12 while keeping any fluid from the lower compartment 12 from escaping the lower compartment 12 through the compressor/pump 48. As seen in FIG. 2, the rotating base 40 is attached by means of threads 50 to the bottom of the lower compartment 12. Other commonly know attachment means are also available to those skilled in the art so long as they provide a means to attach and detach the rotating base to the lower compartment 12. As seen in FIG. 2 the rotating base 40 has been released from the lower compartment 12. The rotating base 40 is attached to a piston rod 52 that is received in the air compressor/pump 48. A piston in the compressor/pump 48 forces air out an exit end 54 of the compressor/pump 48. As the rotating base 40 is pushed up and down in a pumping action, the air pressure in the lower compartment 12 is increased. This is due to the lower compartment 12 being a sealed water/air tight compartment when it is screwed onto the bottom 48 of the upper compartment 14.

The lower compartment 12 also has a liquid drawing tube 56 having one end attached to the cap 43 and an opposite end 58 extending to the floor 38. The end 58 may be provided with a filter so that any solid objects cannot enter the drawing tube 56.

Again looking in the upper compartment 14 in FIGS. 3 and 4, the cap 43 has a connector tube 60 in fluid communication with the liquid drawing tube 36. The connector tube 60 is fluidly connected to an on-off spray button 62. The on-off spray button operates a sliding valve 64 that controls the flow of the liquid 36 through the valve 64 as is known in the art. Exiting from and in fluid communication with the valve 64 is a liquid delivery tube 66. The liquid delivery tube 66 passes through a passageway 68 in the left upstanding arm 18, through a pivot connection 70, through a fan housing passageway 72, and into the atomizer spray nozzle 32.

The upper compartment 14 also contains one or more batteries 74. The type of battery and its power output will be dictated by the designer. Disposable or rechargeable batteries can be used with the output dictated by the energy required to drive the fan 24 and fan motor 26. The batteries 74 are electrically connected to an electrical on-off switch 76. The switch 76 can be a push button type, momentary switch, or a slider switch that will maintain the position to which it is moved until it is moved to a different position. Electrical wires 78 are attached from the batteries 74 to the fan motor 26. The wires 78 leave the fan motor 26 and return to the output of the electrical switch 76. When the switch 76 is turned "on" the circuit is completed and the fan motor 26 is energized which in turn causes the fan 24 to spin.

The electrical wires 78 pass through the passageway 68 in the left upstanding arm 18 and through the pivot connection 70 just as the liquid delivery tube 66. However after passing through the pivot connection 70, the electrical wires 78 enter a hollow wireway passageway 80 in the left fan support beam 28. The electrical wires 78 are connected to the fan motor 26. The pivot connection can take any of numerous designs as know in the art. The opposite side of pivot connection 70 is provided with a second pivot connection 71 that allows the fan housing to rotate about the axis of a line drawn between pivots 70 and 71. The important feature is that the pivot connection 70 provides a passageway for the liquid delivery tube 66 to pass from the left upstanding arm 18 to the fan housing passageway 72 and for the electrical wires 78 to pass from the left upstanding arm 18 to the wireway passageway 80. This allows the fan housing 22 to pivot while the components mounted to or in the fan housing 22 to be fluidly and electrically connected as required. A stop can be provided so that the amount of rotation of the fan housing 22 is controlled so that the fan housing rotates within a certain and controlled amount. This keeps the electrical wires 78 and fluid deliver tube 66 from becoming tangled and twisted.

It can be seen that the fan housing 22 is substantially circular so that it fits within the u-shaped bottom 16 of the yoke 15. The circular design also accommodates the circular shape of the fan 24.

The lower compartment 12 is tapered outward from the center to its bottom providing a larger bottom than at the mid section of the lower compartment 12. The rotating base 40 has a diameter the same size as the bottom of the lower compartment 12. The base 40 has a substantially flat bottom surface so that the misting fan 10 can be placed on a flat surface and operated without the need for the user to hold the misting fan 10 in his or her hand. Thus the device can be placed on a desk, the fan 24 turned on, and it will provide a breeze that can be directed to the face of the user. The user can selectively press the on-off spray button 62 to provide a mist to the air stream so long as the lower compartment 12 is pressurized. With the fan 24 in the off position, the user still activate a mist directed wherever the user points the spray nozzle 32.

Thus there has been provided a portable misting fan that provides a mist and a cooling flow of air to the user. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A portable fan and misting device comprising:
    a lower compartment with a hollow interior defining a water reservoir,
    a manually operated pump mounted in the lower reservoir for supplying positive pressure to the lower compartment,
    an upper compartment attached to the lower compartment, the upper compartment having at least two upstanding arms,
    at least one of the upstanding arms having a first hollow passageway within the upstanding arm,
    a circular fan housing having a top and bottom, and further having a second fluid passageway within a perimeter portion of the fan housing,
    an electrically operated fan mounted within the fan housing by means of a fan supporting beam connecting the fan housing to the electrically operated fan,
    a third hollow passageway within the fan supporting beam, the third hollow passageway extending from the fan housing to the fan,
    a power source connected to the fan by electrical wires,
    a pivotal connection having a fourth hollow, internal passageway, the pivotal connection mounting the fan housing to the upstanding arms so that the fan housing can rotate about the pivotal connection,
    a spray misting nozzle mounted to the top of the fan housing,
    an electrical connection extending from the power source in the upper compartment, through the first hollow passageway in the at least one upstanding arm, through the fourth hollow internal passageway in the pivotal connection, through the third hollow passageway in the supporting beam, and connected to the fan, and
    a fluid delivery tube mounted in the lower compartment and extending from the lower compartment, through the upper compartment, through the first hollow passageway in the at least one upstanding arm, through the fourth hollow internal passageway in the pivotal connection, through the second fluid passageway in the fan housing, and fluidly connected to the spray misting nozzle, and
    a control valve connected to the fluid delivery tube for controlling the flow of liquid from the lower compartment to the spray misting nozzle.

2. The device of claim 1 wherein the pump comprises a manually operated pump handle connected to a piston, the pump handle operated by a user to move the pump handle and piston for providing positive pressure to the lower compartment.

3. The device of claim 2 wherein the pump handle is connected to, the lower compartment by releasable attachment means that allow the pump handle to be unfastened from the lower compartment for operation of the pump handle.

4. The device of claim 1 wherein the lower compartment is attached to the upper compartment by a threaded nozzle extending from the lower compartment into the upper compartment such that when the lower compartment is attached to the upper compartment the lower compartment is a fluid tight compartment.

5. The device of claim 1 and further comprising a switch operating, the control valve, the switch being operable as an intermittent button or in a constantly open position until turned off.

6. The device of claim 1, wherein the two upstanding arms comprise a yoke with the fan housing mounted in the yoke by means of the pivotal connection.

7. The device of claim 6 and wherein the pivotal connection comprises a first and second pivotal connection for mounting the fan housing to each of the upstanding arms whereby the fan housing is supported on opposite sides by the first and second pivotal connections.

8. The device of claim 7 and further comprising a second supporting beam for connecting the fan to the fan housing.

9. The device of claim 1 wherein the fluid delivery tube extends substantially forty-five degrees from the pivotal connection to the spray nozzle through the second fluid passageway.

* * * * *